United States Patent
Pan et al.

(10) Patent No.: US 7,125,913 B2
(45) Date of Patent: Oct. 24, 2006

(54) PARTIAL OXIDATION REACTORS AND SYNGAS COOLERS USING NICKEL-CONTAINING COMPONENTS

(75) Inventors: Chien-Ping Pan, Ponca City, OK (US); Harold A. Wright, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 69 days.

(21) Appl. No.: 10/389,068

(22) Filed: Mar. 14, 2003

(65) Prior Publication Data

US 2004/0180975 A1    Sep. 16, 2004

(51) Int. Cl.
*C01B 3/38* (2006.01)
*C07C 27/06* (2006.01)

(52) U.S. Cl. ............... 518/703; 252/373; 422/240
(58) Field of Classification Search ............ 252/373; 422/240; 518/703
See application file for complete search history.

(56) References Cited

U.S. PATENT DOCUMENTS

| | | | |
|---|---|---|---|
| 4,230,668 A * | 10/1980 | Sheely et al. ............ 422/140 |
| 4,822,521 A | 4/1989 | Fuderer |
| 5,112,527 A | 5/1992 | Kobylinski |
| 5,254,318 A | 10/1993 | Williams |
| 5,545,337 A * | 8/1996 | Hong .................... 210/761 |
| 5,714,092 A * | 2/1998 | van Looij et al. ........ 252/373 |
| 6,007,699 A * | 12/1999 | Cole ..................... 208/134 |
| 6,048,472 A * | 4/2000 | Nataraj et al. ........... 252/373 |
| 6,077,323 A * | 6/2000 | Nataraj et al. ........... 48/198.1 |
| 6,110,979 A * | 8/2000 | Nataraj et al. ........... 518/704 |
| 6,187,226 B1 * | 2/2001 | Detering et al. .......... 252/373 |
| 6,274,113 B1 * | 8/2001 | Heyse et al. ............ 423/418.2 |
| 6,296,953 B1 | 10/2001 | Linden et al. ............ 428/681 |
| 6,333,294 B1 * | 12/2001 | Chao et al. .............. 502/325 |
| 6,402,989 B1 * | 6/2002 | Gaffney ................. 252/373 |
| 6,441,228 B1 * | 8/2002 | Nakahara et al. ......... 562/600 |
| 6,548,030 B1 * | 4/2003 | Heyse et al. ............ 422/240 |
| 6,695,983 B1 * | 2/2004 | Prasad et al. ............ 252/373 |
| 6,737,175 B1 * | 5/2004 | Ramanarayanan et al. .. 428/674 |
| 6,803,029 B1 * | 10/2004 | Dieckmann ............. 423/652 |
| 6,878,362 B1 * | 4/2005 | Kumar et al. ............ 423/651 |
| 2002/0115730 A1 * | 8/2002 | Allison et al. ........... 518/703 |
| 2004/0262579 A1 * | 12/2004 | Van Dongen et al. ...... 252/373 |
| 2005/0118089 A1 * | 6/2005 | Abbott et al. ........... 423/418.2 |

FOREIGN PATENT DOCUMENTS

| | | | | |
|---|---|---|---|---|
| EP | 0345925 | * | 12/1989 | ............. 422/240 |
| EP | 0367537 | * | 5/1990 | ............. 422/240 |
| WO | WO 03/036165 | | 5/2003 | |

OTHER PUBLICATIONS

E. Pippel et al., *Microprocesses of metal dusting on iron*, Steel Research (May 1995), vol. 66, No. 5, pp. 217-221.

J.C. Nava Paz et al., *Metal Dusting*, Oxidation of Metals (1993), vol. 39, Nos. 5/6, pp. 437-456, no month.

G.Y. Lai, *Ch. 4: Carburization and Metal Dusting*, High-Temperature Corrosion of Engineering Alloys (Aug. 1991), pp. 47-72.

(Continued)

*Primary Examiner*—Wayne A. Langel
(74) *Attorney, Agent, or Firm*—Conley Rose P.C.

(57) ABSTRACT

Disclosed are methods and apparatus for producing synthesis gas and higher hydrocarbons from light hydrocarbons and molecular oxygen as well as the higher hydrocarbons produced by the disclosed methods and apparatus. The methods and apparatus disclosed utilize components comprising nickel and nickel alloys.

41 Claims, 2 Drawing Sheets

OTHER PUBLICATIONS

E. Pippel et al., *Micromechanisms of metal dusting*, Eurocorr '98 Solutions to Corrosion Problems, Utrecht, The Netherlands (Sep. 28-Oct. 1, 1998), 4 pages.

R. Schneider et al., *Microprocesses of metal dusting on nickel and Ni-base alloys*, Steel Research (1997), vol. 68, No. 7, pp. 326-332, no month.

B. Schmid et al., *In situ environmental scanning electron microscope observations of catalytic processes encountered in metal dusting corrosion on iron and nickel*, Applied Catalysis A: General (2001), vol. 215, No. 1-2, pp. 257-270, no month.
(Empty #).

H.J. Grabke, *Mechanism and prevention of metal dusting*, Stainless Steel World (2001) P0172, pp. 37-43, no month.

S. Forseth et al., *Metal dusting phenomenon during carburization of FeNiCr alloys at 850-1000° C.*, Materials and Corrosion (1995), vol. 46, pp. 201-206, no month.

G. Bian et al., *Syngas adsorption on precipitated iron catalysts reduced by H2, syngas or CO and on those used for high-pressure FT synthesis by in situ diffuse reflectance FTUIR spectroscopy*, Applied Catalysis A: General (2001), vol. 219, pp. 13-24, no month.

H.J. Grabke, *Metal dusting of low- and high-alloy steels*, Corrosion (1995), vol. 51, No. 9, pp. 711-720, no month.

H.J. Grabke, *Corrosion by carbonaceous gases, carburization and metal dusting, and methods of prevention*, Materials at High Tenmperatures (2000), vol. 17, No. 4, pp. 483-487, no month.

H. Cheng et al., *Role of transition metal oxides in metal dusting: density functional study*, AIChE Journal (Jan. 1998), vol. 44, No. 1.

H.J. Grabke et al., *Carburization and metal dusting on iron*, ISIJ International (2001) Supplement, vol. 41, pp. 1-S8, no month.

R.F. Hochman, *Theory of metal dusting in iron-base alloys*, Materials Engineering and Sciences Division Biennial Conf., AIChE Preprint vol. Atlanta (Feb. 1970).

E.M. Muller-Lorenz et al., *Metal dusting and coking on steels by synthesis gas*, Int. Conf. on Corrosion in Refinery, Petrochemical and Power Generating Plants, Venice, Italy (May 2000).

H.J. Grabke, *Mechanisms of carburization, metal dusting and coking—ways and means for protection*, Eurocorr (1997) Trondheim, Norway, vol. II, pp. 1-8, no month.

H.J. Grabke et al., *On the mechanism of catastrophic carburization: 'Metal Dusting'*, Corrosion Science, vol. 35, os 5-8, pp. 1141-1150, no date.

P.A. German et al., *Oxidation kinetics of carbon steels in pressurized $CO_2$-based atmospheres at elevated temperatures*, Proceedings of the British Nuclear Energy Society International Conference (Corrosion of Steels in $CO_2$) Reading, UK (1974), no month.

P.A. German et al., *Mild steel oxidation in $CO_2$ cooled reactors*, Proceedings of the British Nuclear Energy Society International Conference (Gas-cooled reactors today), Bristol UK (1982), no month.

R.A. Brierley, *Studies of the oxidation of 9 and 12 Cr steels in high temperature, high pressure $CO_2$*, Nuclear Energy (Oct. 1986).

P.C. Rowlands et al., *Oxidation of 9Cr steels in high pressure, high temperature $CO_2$*, Proceedings of the British Nuclear Energy Society Intn'l Conf.l (Corrosion of Steels in $CO_2$) Reading, UK (1974), no month.

P.C. Rowlands et al., *Ch. 107: The oxidation behaviour of Fe-9Cr-I Mo steels*, B.N.E.S. International Conference (Gas-cooled reactors today), Bristol, UK (1982), pp. 173-181, no month.

S.J. Allan et al., *Paper 22: A survey of the oxidation behaviour of stainless steels in $CO_2$ Environments*, B.N.E.S. International Conference (Corrosion of Steels in $CO_2$), Reading, UK (Sep. 1974), 7 pages.

J.R. Nicholls et al., *Advanced High Temperature Coatings for Gas Turbines*, Industrial Corrosion (Jul. 1987), pp. 8-17.

P.J. Nolan et al., *The carburization of Fe-Cr Alloys and Steels in $CO/CO_2$ Environments*, International Conference 'Behaviour of high temperature alloys in aggressive environments', The Metals Society, London (1980), pp. 705-718, no month.

H.J. Grabke et al., *Carburization and Oxidation*, Materials Science and Engineering (1987), vol. 87, pp. 23-33, no month.

A. Katsman et al., *Mechanism of Disintegration During Metal Dusting*, Proc. Of the 1996 125$^{th}$ TMS Annual Meeting, Warrendale PA (Feb. 1996), pp. 413-420.

C.M. Chun et al., *Carbon-Induced Corrosion of Nickel Anode*, J. Electrochem. Soc. (2000), vol. 147, No. 10, pp. 3680-3686, no month.

S. Kihara et al., *Development of a dual-wall tube for a coal gasification power plant through a hot isostatic pressing-hot extrusion process*, Materials at High Temperatures (1993), vol. 11, Nos. 1-4, pp. 167-169, no month.

T.P. Levi et al., *A study of the relationship between metal dusting and pressure*, Paper 01375, Corrosion 2001. NACE, 6 pages, no month.

H.J. Grabke, *Carburisation and metal dusting of steels and high temperature alloys by hydrocarbons*, Int. Conf. on Corrosion in Refinery, Petrochemical and Power Generation Plants, Venice, Italy (May 2000), pp. 1-11.

A.S. Fabiszewski et al., *The effect of temperature and gas composition on the metal dusting susceptibility of various alloys*, Corrosion (2000) Paper 0532, pp. 1-12, no month.

W.T. Bakker, *Mixed Oxidant Corrosion in Nonequilibrium Gasifier Environments*, Oxidation of Metals. (1996), vol. 45, Nos. 5/6, pp. 487-505, no month.

H.J. de Bruyn et al., *Apparent influence of steam on metal dusting*, NACE, Corrosion (2001) Paper 01383, pp. 8 pages, no month.

J.A. Colwell et al., *Reactions of Fe-Cr and Ni-Cr Alloys in $CO/CO_2$ Gases at 850 and 950° C.*, Metallurgical Trans. A (Jun. 1988), vol. 17A, pp. 1065-1074.

H.J. Grabke et al., *Stability of the Chromia Layer on Steels in Flowing Nonequilibrium $H_2$-$H_2O$-$CH_4$-CO Mixtures at 950° C.*, Metallurgical Trans. A (Jun. 1986), vol. 17A, pp. 915-921.

B.A. Baker et al., *Alloy selection for environments which promote metal dusting*, NACE, Corrosion (2000) Paper 00257, pp. 1-18, no month.

H.J. Grabke et al., *Metal dusting of low alloy steels*, Wekstoffe und Korrosion (Apr. 1994), vol. 45, No. 4, pp. 215-221.

A. Schneider et al., *Influence of $H_2S$ on growth and decomposition of iron carbides under metal dusting conditions*, Eurocorr '98 Solutions to Corrosion Problems, Utrecht, Netherlands (Sep. 1998), 3 pages.

H.J. Grabke et al., *Effect of sulfur on the stability of cementite*, Steel Research (Jun. 1995), vol. 66, No. 6, pp. 254-258.

B.A. Baker et al., *Metal-dusting of nickel-containing alloys*, NACE, Corrosion (Mar. 1998) Paper 445, pp. 1-13.

M. Schutze, *The Healing Behavior of Protective Oxide Scales on Heat-Resistant Steels After Cracking Under Tensile Strain*, Oxidation of Metals (1986), vol. 25, Nos. 5/6, pp. 409-421, no month.

E.M. Muller-Lorenz et al., *Effects of Surface State, Microstructure and Alloying Additions on the Metal Dusting Resistance of High Alloy Steels*, Eurocorr '98 Book of Abstracts 1998 Solutions to Corrosion Problems, Utrecht, Netherlands (Sep. 28-Oct. 1, 1998), 3 pages.

H.J. Grabke et al., *Metal Dusting of Nickel-Based Alloys*, Materials Selection & Design (Jul. 1998), vol. 37, No. 7, pp. 58-63.

H.J. Grabke et al., *Mechanisms and Prevention of Corrosion in Carbonaceous Gases*, Materials Science Forum (2001), vol. 369-372, pp. 101-108, no month.

W. Steinkusch, *Heat-Resistant Steels and Alloys in the Petrochemical Industry*, ASM: 82-00, 820461-0225, NDN: 100-0057-2316-5, Behaviour of High Temperature Alloys in Aggressive Environments, Proc. Conf. Petten, The Netherlands (Oct. 1979-1980), pp. 83-102, ISSN: 090435730.

D. Monceau et al., *Metal Dusting of Stainless Steels*, Materials Science Forum (1997) Pt. 2, vols. 251-254, pp. 650-670, no month.

M. Maier et al., *A study of the factors contributing to the metal dusting of Fe-Cr-Ni alloys in highly carburizing atmospheres*, Materials at High Temperatures (2000), vol. 17, No. 2, pp. 347-354, no month.

W. Schendler et al., *High Temperature Corrosion of Materials for Steam-coal Gasification Utilizing Nuclear Process*, Corrosion Resistant Materials for Coal Conversion Systems, London, UK (May 1982), pp. 201-218.

H.J. Grabke et al., *Resistance of 9-20% Cr steels against metal dusting*, Steel Research (Apr. 1997), vol. 68, No. 4, pp. 179-185.

H.J. Grabke et al., *Nickel-Based Alloys in Carbonaceous Gases*, Corrosion (Aug. 2000), vol. 56, No. 8, pp. 801-808.

R.T. Jones, *Metal Dusting—An Overview of Current Literature*, NACE Corrosion (2001) Paper 01372, 12 pages, no month.

H.J. Grabke et al., *Mechanisms of Carburization and Metal Dusting Methods of Protection*, Proc. Int. Conf. on Corrosion CONCORN '97 (Dec. 1997) Mumbai, India, pp. 89-98.

E.M. Muller-Lorenz, *Metal Dusting Exposures of Modified Stainless Steels*, Materials Science Forum (2001) vols. 369-372, pp. 955-962, no month.

D.C. Agarwal et al., *Nickel Alloys Combat High-Temperature Corrosion*, Advanced Materials & Processes (Oct. 1995), vol. 148, No. 4, pp. 42-45.

K.L. Baumert et al., *Materials Experience in Methanol Reforming Units*, Materials Perf. (May 1998), vol. 37, No. 5, pp. 60-64.

G.T. Bayer, *Aluminizing Alloys to Increase Service Life in Heat-Treating and Furnace Applications*, Industrial heating (May 1996), vol. 63, No. 5, pp. 57-58, 60.

R. Kirchheiner et al., *Correlation of Oxidation, Carburization and Metal Dusting: 'Controlling Corrosion by Corrosion,'* NACE, Houston, TX, Corrosion (Mar. 2001) Paper 01374, 18 pages.

G. W. Horsley et al., *The Inhibition of Carbon Deposition on Stainless Steel by Prior Selective Oxidation*, Applications of Surface Science (1984), vol. 18, pp. 273-286, no month.

G. Sorell, *Alloy Performance in High Temperature Oil Refining Environments*, Proceedings of the $2^{nd}$ Intern'l Conf. on Heat Resistant Materials, Gatlinberg TN (Sep. 1995), pp. 223-232.

W. T. Bakker et al., *Effect of Refractory Elements on Corrosion of Stainless Steels in Syngas Coolers*, Heat Resistant Materials, Proceedings of the First Intern'l Conference, Fontana, WI (Sep. 1991), pp. 409-414.

H.J. Grabke et al., *Occurrence and prevention of metal dusting on stainless steels*, NACE, Corrosion (2001) Paper 01373, 5 pages, no month.

H.J. Grabke et al., *Effects of Grain Size, Cold Working, and Surface Finish on the Metal-Dusting Resistance of Steels*, Oxidation of Metals (1998), vol. 50, Nos. 3/4, pp. 241-254, no month.

H.J. Grabke et al., *Effects of Temperature and of Hydrogen Sulfide and Trichlorethylene Additions in the Metal Dusting by Hydrocarbons*, Eurocorr (1999), 4 pages, no month.

F. Starr et al., *High Temperature Corrosion Aspects of Thermal Hydrogen Processes*, Environmental Degradation of High Temperature Materials, Douglas, Isle of Man (Mar.-Apr. 1980), vol. 4, pp. 1-17.

R.A. Perkins et al., *Metal Dusting Corrosion In Coal Gasification Environments*, Properties of High Temperature Alloys—with Emphasis on Environmental Effects, Las Vegas, NV (Oct. 1976), pp. 732-749.

M.A. Harper et al., *Cyclic Oxidation Plus Carburization of Heat-Resistant Alloys*, NACE, Corrosion (1995), vol. 51, No. 3, pp. 191-200, no month.

D.J. Hall et al., *Carburisation behaviour of HK40 steel in furnances used for ethylene production*, High Temperatures—High Pressures (1982), vol. 14, No. 5, pp. 527-539, no month.

I. Rommerskirchen, *Cost-effective concepts for furnace rollers based on Nicrofer 6025 HT—alloy 602 CA*, Stainless Steel World (2001), pp. 316-319, no month.

U. Brill et al., *Developments in high temperature alloy metallurgy for industrial applications up to 1200° C.*, Stainless Steel World (2001), pp. 297-304, no month.

D.J. Tilleck et al., *Select the Right Alloys for Refineries and Petrochemical Plants*, Chemical Engineering Progress (Feb. 1999), vol. 95, No. 2, pp. 59-66.

M. Schutze et al., *Protection of steels against metal dusting attack by coatings*, Stainless Steel World (2001), pp. 306-314, no month.

E. Redmond et al., *A Low Coking and Carburization Resistant Coating for Ethylene Pyrolysis Furnaces*, NACE, Corrosion (2001) Paper 01392, 10 pages, no month.

G.T. Baker, *Surface Engineered Coatings for Metal Dusting*, NACE, Corrosion (2001) Paper 01387, 8 pages, no month.

A.R. Kurlekar et al., *Effect of ID Surface Modification on Carburization of Ethylene Furnace Tubes*, NACE, Corrosion (2001) Paper 01388, 9 pages, no month.

H. Stahl et al., *Survey of Worldwide Experience with Metal Dusting*, Ammonia Plant Safety (and related facilities) (1996), vol. 36, pp. 180-191, no month.

M.L. Holland et al., *Metal Dusting Failures in Methane Reforming Plant*, Int. J. of Pressure Vessels and Piping (1995), vol. 66, No. 1-3, pp. 125-133, no month.

G.M. Tanner, *Metal Dusting (Catastrophic Carburization) of a Waste Heat Boiler Tube*, Engineering Failure Analysis (Dec. 1994), vol. 1, No. 4, pp. 189-306, no month.

T.A. Ramanarayanan et al., *Carbon-Induced Corrosion of Metals and Alloys*, Materials Science Forum (2001), vols. 369-372, pp. 55-76, no month.

R.L. Colwell, *Gaseous Corrosion of a Heat-Resistant Alloy (Metal Dusting)*, High-Temperature Failures: Handbook of Case Histories in Failure Analysis, ASM Int., Materials Park, OH (1992), vol. 1, pp. 351-353 (1992), no month.

H. de Wet et al., *Postcommissioning Operating Experience at the Mossgas Plant*, Ammonia Plant Safety (and related facilities) (1998), vol. 38, pp. 64-72, no month.

A.B. Smith et al., *The Use of Aluminide Diffusion Coatings To Improve Carburization Resistance*, NACE, Houston, Texas, Corrosion (Mar. 2001) Paper 01391, 5 pages.

S.B. Parks, *Update in alloy selection for ammonia furnaces*, Stainless Steel World (Apr. 1997), pp. 44-49.

M. Maier et al., *Studies concerned with the metal dusting of Fe-Cr-Ni materials*, NACE, Corrosion (1999) Paper 75, pp. 1-13, no month.

R.A. Brierley et al., *Preliminary Note on Observations of Carbon Deposition From Simulated AGR Gases*, BNDC/R.717 (Jan. 1975), pp. 1-28.

R.A. Brierley, *Further Observation of Gross Carbon Deposition in the Routine Operation of NPC(W) $CO_2$ Oxidation Autoclaves*, NPC(W)/R.316 (Jul. 1979), pp. 1-20.

B.A. Baker et al., *Nickel-Base Material Solutions to Metal Dusting Problems*, ASM 02-06 200206-35-1515 NDN-100-0142-5016-1; Corrosion 2002 Conference, Houston, TX (Apr. 2002), 5 pages.

H.J. Grabke et al., *Metal dusting of nickel-base alloys*, Materials and Corrosion (Sep. 1996), vol. 47, No. 9, pp. 495-504.

A.P. Moore, *Metal Dusting A Literature Review*, 69391/TR/001, Issue 01 (Apr. 2002), 46 pages.

Brochure, *INCONEL alloy 693—Excellent Resistance to Metal Dusting and High Temperature Corrosion*, Special Metals, www.specialmetals.com, 8 pages, no date.

H. Gunardson, *Ch. 2: Synthesis Gas Manufacture*, Industrial Gases In Petrochemical Processing, Marcel Dekker, Inc. (1998), pp. 41-80, no month.

J.J. Barnes et al., *Evaluation of the Metal Dusting Resistance of Materials for Conoco Syngas Process Equipment*, Report: 2001-CRD, 34 pages, no month.

M.G. Angell, *Evaluation of the resistance to metal dusting in Conoco/Du Pont petrochemical synthesis environments*, NNC Limited, C6123/TR/001, 23 pages, no date.

PCT/US2004/007788, PCT International Search Report, Date of Mailing Oct. 5, 2004.

B.J. Crewdson and P.W. Farnell, "*Development of Metal Dusting Resistant Materials for GTL Production*", International Workshop On Metal Dusting, Argonne National Laboratory, Argonne, Illinois, Sep. 26-28, 2001, 5 pages.

H.J. Grabke et al., "*Metal Dusting of Nickel-Based Alloys*," Materials Selection Design (Jul. 1998), pp. 58-63.

J.S. Gittinger and W.J. Arvan, "*Considerations for the Design of RDF-Fired Refuse Boilers*", Babcock & Wilcox, presented at Power-Gen Europe '98, Milan, Italy (Jun. 9-11, 1998), pp. 1-8.

J.L. Blough and W.W. Seitz, "*Fireside Corrosion Testing of Candidate Superheater Tube Alloys, Coatings, and Claddings—Phase*

III", Foster Wheeler Development Corporation, Livingston, NJ (2002), 10 pages, no month.

K. Nassauer and M. Fix, "*Design features and material selection of process gas heat recovery systems in ammonia plants under consideration of metal dusting, hydrogen embrittlement and nitriding,*" Borig (undated), 32 pages.

D.L. Klarstrom et al., "*The Metal Dusting Behavior of Several High Temperature Nickel Based Alloys*," Corrosion 2001, Paper No. 01379 (2001) NACE International, 7 pages, no month.

M.L. Holland, "*Practical Experience With Countering Metal Dusting In a Methane Reforming Unit*," Corrosion 2001, Paper No. 01385 (2001) NACE International, 11 pages, no month.

Brochure from Borsig (date unknown), "*Synthesis Gas Cooler Downstream of Partial Oxidation of Oil or Natural Gas,*" 12 pages, no month.

Böhler Hochdrucktechnik, http://www.bohler-hochdrucktechnik.com/, 2 pages, no date.

\* cited by examiner

PARTIAL OXIDATION REACTORS AND SYNGAS COOLERS USING NICKEL-CONTAINING COMPONENTS

CROSS-REFERENCE TO RELATED APPLICATIONS

Not applicable.

STATEMENT REGARDING FEDERALLY SPONSORED RESEARCH

Not applicable.

BACKGROUND

Natural gas commonly serves as a fuel for power generation or a fuel for domestic use. The process of obtaining natural gas from an earth formation typically includes drilling a well. Wells that provide natural gas are often remote from locations with a demand for the consumption of the natural gas.

Thus, natural gas may necessarily need to be transported large distances from the wellhead to commercial destinations in pipelines. This transportation presents technological challenges due in part to the relatively large volume occupied by gaseous natural gas. Therefore, the process of transporting natural gas may include chilling and/or pressurizing the natural gas in order to liquefy it. However, the expenditures associated with liquefaction may be high and liquefaction may not be economical for formations containing small amounts of natural gas.

Formations that include small amounts of natural gas may be small natural gas fields or natural gas as a byproduct of oil production ("associated gas"). In the past, associated gas may have been flared. However, current environmental concerns and regulations may discourage or prohibit this practice.

Further, naturally occurring sources of crude oil used for liquid fuels such as gasoline, jet fuel, kerosene, and diesel have been decreasing and supplies may not meet demand in the coming years. Fuels that are liquid under standard atmospheric conditions have the advantage that they can be transported more easily in a pipeline than natural gas, since they do not require the energy, equipment, and expense required for liquefaction.

Thus, for all of the above-described reasons, there may be interest in developing technologies for converting natural gas to more readily transportable liquid fuels. One method for converting natural gas to liquid fuels involves two sequential chemical transformations. In the first transformation, natural gas or methane, the major chemical component of natural gas, is reacted to form a mixture of CO and $H_2$ ("synthesis gas" or "syngas"). This syngas generation usually occurs either by dry reforming, steam reforming, or partial oxidation, respective examples of which are set forth below for methane:

$$CH_4 + CO_2 \rightarrow 2CO + 2H_2 \quad (1)$$

$$CH_4 + H_2O \rightarrow CO + 3H_2 \quad (2)$$

$$CH_4 + \tfrac{1}{2}O_2 \rightarrow CO + 2H_2 \quad (3)$$

Reactions (1) and (2) are endothermic and reaction (3) is exothermic. Examples of syngas processes are disclosed in Gunardson, "Industrial Gases in Petrochemical Processing," 41–80 (Marcel Dekker Inc. 1998), and in U.S. Pat. No. 6,402,989 to Gaffney, and U.S. patent application Ser. No. 20020115730 to Allison et al., all incorporated herein by reference.

While its use is currently limited as an industrial process, the direct partial oxidation or catalytic partial oxidation of methane has recently attracted much attention due to its inherent advantages, such as the fact that due to the heat that is released during the process, there is no requirement for the continuous input of heat in order to maintain the reaction.

In the second transformation, known as hydrocarbon synthesis (e.g., Fischer-Tropsch or FT synthesis), carbon monoxide reacts with hydrogen to form organic molecules containing carbon and hydrogen. An example of a Fischer-Tropsch process is disclosed in U.S. Pat. No. 6,333,294 to Chao et al., incorporated herein by reference.

Another example of a Fischer-Tropsch reaction scheme comprises charging a feed gas comprising hydrogen and carbon monoxide (e.g., syngas) to an FT reactor. $H_2/CO$ mixtures suitable as a feedstock for conversion to hydrocarbons according to the process of this invention can be obtained from light hydrocarbons such as methane by means of steam reforming, partial oxidation, or other processes known in the art or disclosed herein. The hydrogen may provided by free hydrogen, although some Fischer-Tropsch catalysts have sufficient water gas shift activity to convert some water to hydrogen for use in the Fischer-Tropsch process. The molar ratio of hydrogen to carbon monoxide in the feed may be greater than 0.5:1 (e.g., from about 0.67 to about 2.5). If cobalt, nickel, and/or ruthenium catalysts are used, the feed gas stream may contain hydrogen and carbon monoxide in a molar ratio of about 1.6:1 to about 2.3:1. If iron catalysts are used, the feed gas stream may contain hydrogen and carbon monoxide in a molar ratio between about 1.4:1 and about 2.3:1. The feed gas may also contain carbon dioxide and/or a low concentration of compounds or elements that have a deleterious effect on the catalyst, such as poisons. In some instances, the feed gas may need to be pretreated to ensure that it contains low concentrations of sulfur or nitrogen compounds such as hydrogen sulfide, hydrogen cyanide, ammonia and carbonyl sulfides.

The feed gas is contacted with the catalyst in a reaction zone. Mechanical arrangements of conventional design may be employed as the reaction zone including, for example, fixed bed, fluidized bed, slurry bubble column or ebullating bed reactors, among others. Accordingly, the size and physical form of the catalyst particles may vary depending on the reactor in which they are to be used.

The Fischer-Tropsch process may be run in a continuous mode. In this mode, the gas hourly space velocity through the reaction zone typically may range from about 50 to about 10,000 hr$^{-1}$, or from about 300 hr$^{-1}$ to about 2,000 hr$^{-1}$. The gas hourly space velocity is defined as the volume of reactants per time per reaction zone volume. The volume of reactant gases is at standard conditions of pressure (1 atm or 101 kPa) and temperature (0° C. or 273.16 K). The reaction zone volume is defined by the portion of the reaction vessel volume where reaction takes place and which is occupied by a gaseous phase comprising reactants, products and/or inerts; a liquid phase comprising liquid/wax products and/or other liquids; and a solid phase comprising catalyst. The reaction zone temperature may be in the range from about 160° C. to about 300° C. The reaction zone may operate at conversion promoting conditions at temperatures from about 190° C. to about 260° C. The reaction zone pressure may be in the range of about 80 psia (552 kPa) to about 1000 psia (6895 kPa), from 80 psia (552 kPa) to about 600 psia (4137 kPa), or from about 140 psia (965 kPa) to about 500 psia (3447 kPa).

A Fischer-Tropsch product stream may contain hydrocarbons having a range of numbers of carbon atoms, and thus having a range of weights. Thus, the product produced by conversion of natural gas commonly contains a range of hydrocarbons including light gases, gases, light naphtha, naphtha, kerosene, diesel, heavy diesel, heavy oils, waxes, and heavy waxes. These cuts are approximate and there may be some degree of overlapping of components in each range.

The heat generation of the partial oxidation reaction can be a double-edged sword. Temperatures at typical reaction conditions can be in excess of 1,000° C. The high temperatures can lead to problems such as carburisation and/or metal dusting. Metal dusting may be a form of corrosion of metals that occurs in high-carbon activity, low-oxygen potential carburizing gaseous environments, even at intermediate temperatures of 350° C. to 900° C. Metal dusting may be characterized by the production of a powdery mixture of carbon, metal particles and sometimes oxides and carbides or voluminous coke deposition. These corrosion products (dust) can be eroded by a gas flow leaving pits, grooves, or holes on the metal surface. This phenomenon causes metal disintegrated which leads to early pit penetration and failure of plant components. In addition, the coke deposits can reduce syngas cooling efficiency by reducing the gas velocity (e.g., hinder gas flow) and reduce the thermal conductivity because the coke is an insulator. As a result, the residence time of syngas at elevated temperature which is within the metal dusting range may be increased dramatically. Thus, there is a desire to decrease carburisation and/or metal dusting that occurs in the components of a syngas reactor.

The $CO_2$ and $H_2O$ concentrations in partial oxidation reactors are preferably low, which places catalytic partial oxidation reactors in the most severe regions of the metal dusting spectrums (as is illustrated in FIG. 2). It has not previously been known whether nickel based alloy or other metals components can help decrease the effects of metal dusting in relatively severe catalytic partial oxidation reactors.

Therefore, it may be desirable to find materials that can withstand the harsh conditions of temperature and pressure inside a partial oxidation reactor. It may also be desirable to find out what metallurgy can be used in order to reduce or prevent carburisation and/or metal dusting effect during catalytic partial oxidation of light hydrocarbons.

SUMMARY

Advantageously, it has been discovered that by coating various part of the syngas production system with a nickel based alloy or manufacturing various parts from a nickel based alloy, the effects of metal dusting on a syngas production system can be decreased.

Disclosed herein are embodiments of synthesis gas reactors for which at least one is a catalytic partial oxidation reactor, in which at least a portion of the syngas exposed surface of the reaction apparatus comprises a nickel based alloy. Particularly, it is preferred that at least the cooling portion of the syngas production apparatus (e.g., the cooling devices or sheets or surfaces) is coated (preferably, overlain, clad, metallurgically bonded or insert as a sleeve) with or manufactured from a nickel based alloy metal. Particularly, in some embodiments, at least the portion of the cooling device subject to the highest temperatures is coated with or manufactured with a nickel based alloy metal. In other embodiments, the syngas exposed surface of the catalytic partial oxidation reaction chamber (such as, reactor walls or any syngas exposed metallic surface of an object that is placed inside the chamber) also comprises a nickel based alloy. In alternate embodiments, both the syngas exposed surface of a cooling apparatus placed inside the chamber and the syngas exposed surface of the reactor walls are coated with or manufactured from a nickel based alloy metal.

DETAILED DESCRIPTION

Figure 1:
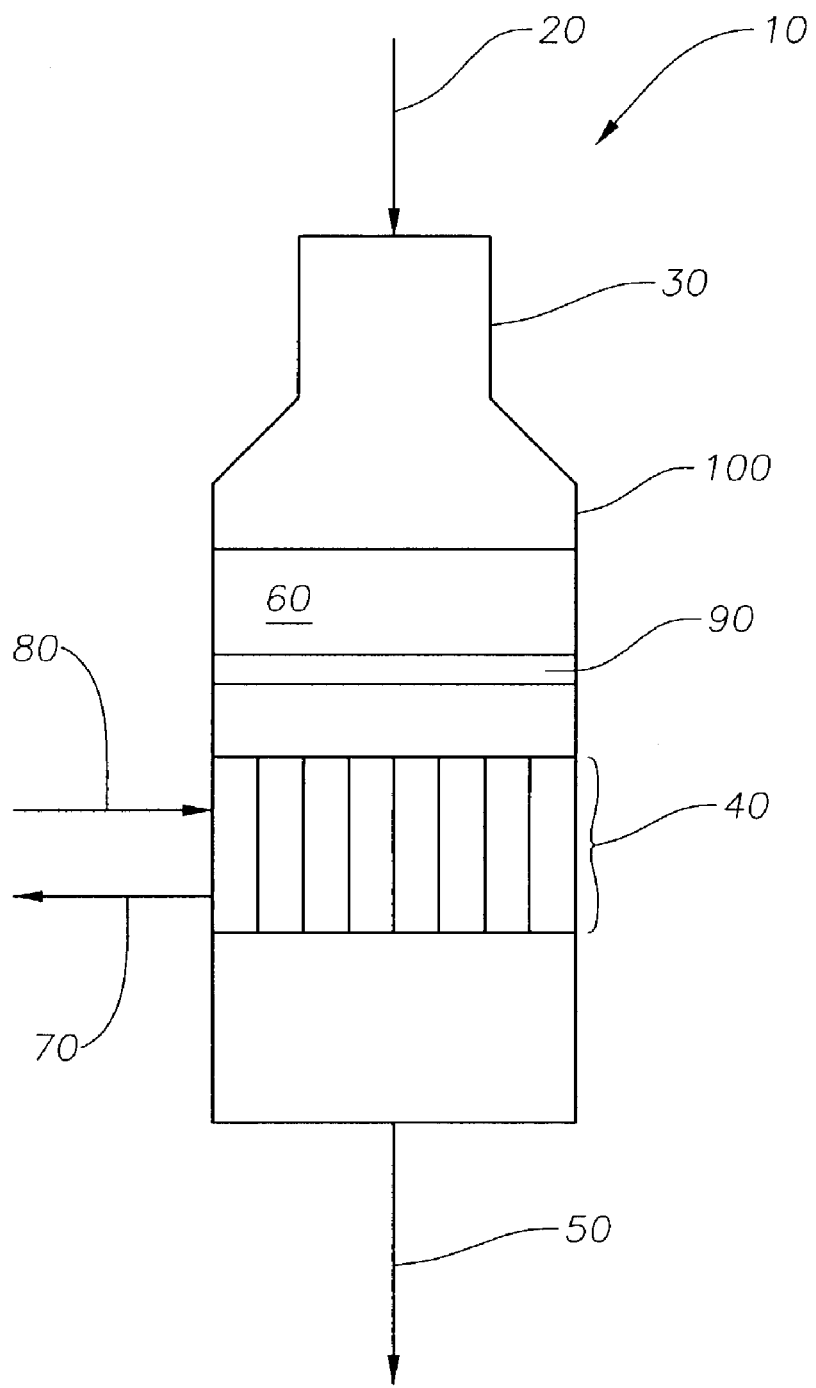
FIG. 1 is a schematic drawing of an embodiment of an apparatus in accordance with the present invention.
Figure 2:
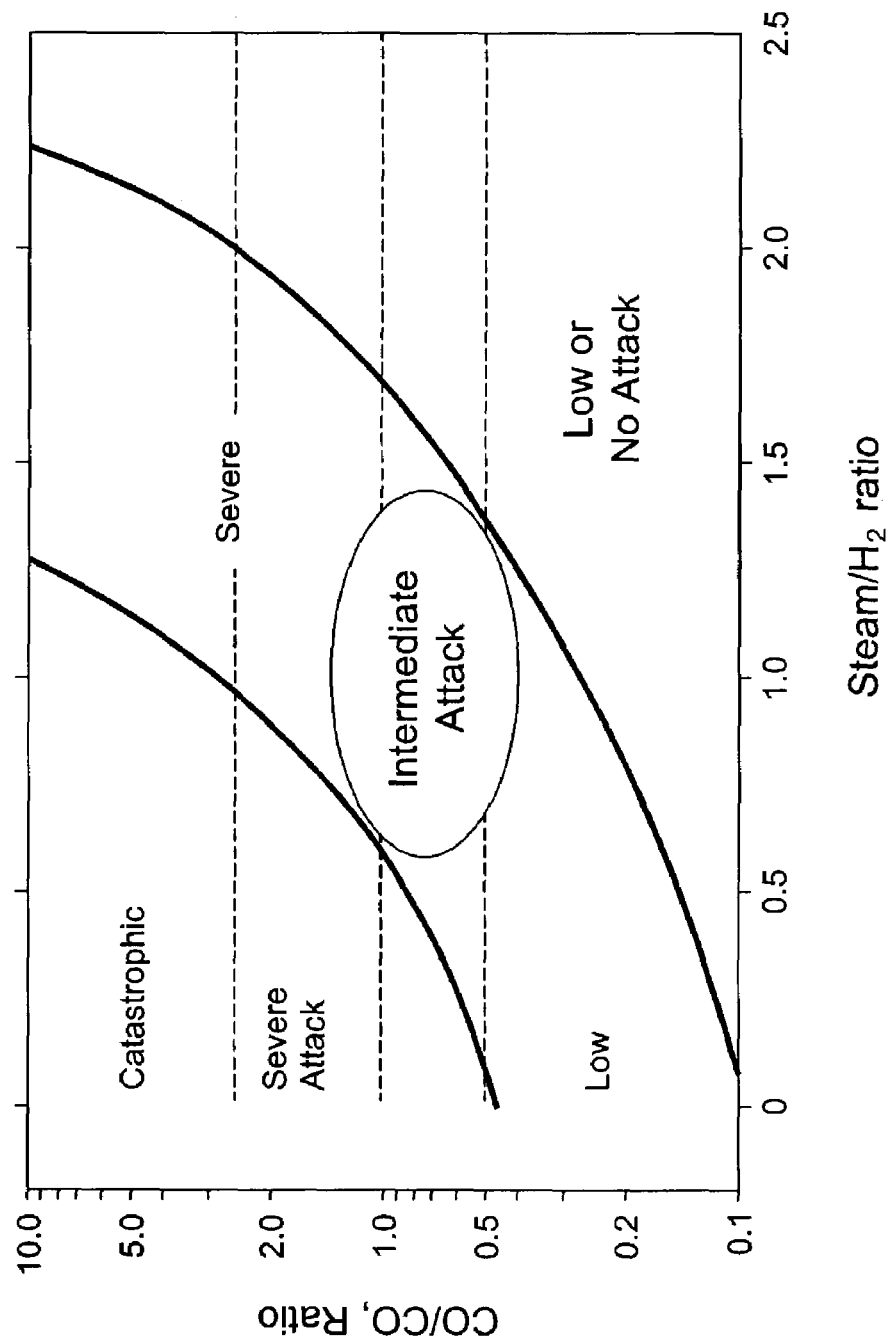
FIG. 2 is a graphical representation of the general degree of metal dusting under certain reactor conditions.

Referring now to FIG. 1, there is shown a synthesis gas reactor 10, having a mixing zone 30, a reaction zone 100 housing catalyst zone 60, a catalyst shield 90, and cooling zone 40 comprising a series of tubes.

Feedstream 20, comprising gaseous or light hydrocarbons (preferably methane or natural gas) and molecular oxygen, is preheated and enters reactor 10 and is mixed in mixing zone 30. The mixed feedstream is then fed into reaction zone 100 and flows over catalyst zone 60 where at least a portion of the light hydrocarbons and oxygen reacts to form synthesis gas or syngas (i.e., a gas comprising primarily a mixture of hydrogen and carbon monoxide. The synthesis gas (and any other compounds exiting catalyst zone 60) flows through catalyst shield 90 and exits at a temperature greater than 700° C. The preferred syngas stream composition leaving the catalyst zone 60 is greater than about 70% $H_2$ and CO (i.e., less than about 30% $H_2O$ and other gases), more preferably, greater than about 75% of $H_2$ and CO, and most preferably, greater than about 95% $H_2$ and CO. The preferred syngas stream has an $H_2$ to CO molar ratio less than 3:1. In other embodiments, the syngas stream has an $H_2$ to CO molar ratio of less than 2.5:1, less than 2.2:1, or less than 2:1. The syngas then flows into cooling zone 40. Cooling zone 40 preferably comprises a plurality of cooling devices. The tubes are preferably arranged substantially parallel to the flow of the synthesis gas. The syngas exposed surfaces of the cooling devices, preferably comprise a nickel alloy containing 50%–75% nickel, more preferably 55–70% nickel, and most preferable 60–68% nickel. Preferably, the nickel alloy may also comprises 0–1% silicon, 0.1–5% aluminum, and 5–40% chromium. The nickel compound is preferably clad or overlain or alternatively, the cooling devices are manufactured from the nickel alloy. Particularly, it may be preferable that the portion of the cooling devices subject to the highest temperatures be coated with or manufactured from the nickel alloy. The syngas exposed surface can be of any texture desired by one of skill in the art, but preferably, the syngas exposed surface of the cooling devices is smooth. The cooling devices are cooled by coolant introduced in coolant stream 80 which circulates around the cooling devices 40 and exits as heat removal stream 70. The coolant can be water or steam or any other acceptable coolant. The coolant stream preferably cools the hot syngas to a temperature between about 350° C. and about 1000° C. The cooled syngas then exits the reactor as syngas stream 50. Syngas stream can then be sent to any desired use for syngas, including without limitation, a hydrocarbon synthesis such as the Fischer-Tropsch process such as that described in Chao et al., an alcohol synthesis (e.g., methanol synthesis), fuel for fuel cell, hydrogen production, or hydroformylation.

The nickel alloy treatments as prescribed for the cooling devices as described above may also be applied to at least a portion of a syngas exposed surface of the syngas reactor if desired. For example, a syngas exposed surface of reactor 10 can also comprise a nickel alloy containing 50%–75% nickel on a weight basis, more preferably 60–68% nickel. Preferably the nickel alloy may also comprise 0–1% silicon, 0.1–5% aluminum, and 5–40% chromium. The nickel compound may be overlain, clad, metallurgically bonded, or inserted as a sleeve on at least a portion of a syngas exposed surface of reactor 10, or alternatively, at least a portion of the reactor 10 is manufactured from the nickel alloy. Particularly, it may be preferable that the portion of reactor 10 subject to the highest temperatures be coated with or manufactured from a nickel based alloy.

As used herein, the term "syngas exposed surface" means any surface which comes into contact with syngas reactants, products, or both. A syngas exposed surface need not be a completely enclosed surface and is not intended to be limiting to any particular orientation with respect to any other surface or the atmosphere.

Should the disclosure of any of the patents and publications that are incorporated herein by reference conflict with the present specification to the extent that it might render a term unclear, the present specification shall take precedence.

While embodiments of the invention have been disclosed herein, it will be understood that various modifications can be made to the system described herein without departing from the scope of the invention. Without further elaboration, it is believed that one skilled in the art, using the description herein, utilize the present invention to its fullest extent.

What is claimed is:

1. A method for producing a product stream comprising syngas from a feedstream comprising light hydrocarbons and molecular oxygen, the method comprising:
   providing a reactor vessel comprising a reaction zone and a cooling device;
   reacting the light hydrocarbons and the oxygen in the reaction zone configured to catalytically partially oxidize at least a portion of the light hydrocarbons to a syngas comprising at least about 70 mol % $H_2$ and CO; and
   flowing at least a portion of the syngas directly into the cooling device,
   wherein at least a portion of a syngas exposed surface of the reactor vessel outside of the cooling device, a syngas exposed surface of the cooling device, or both comprise an alloy comprising primarily nickel.

2. The method of claim 1 wherein at least a portion of the exposed surface of the reactor outside of the cooling device comprises an alloy comprising primarily nickel.

3. The method of claim 1 wherein at least a portion of the exposed surface of the cooling device comprises an alloy comprising primarily nickel.

4. The method of claim 3 wherein the portion of the cooling device which is subject to the highest temperatures comprises an alloy comprising primarily nickel.

5. The method of claim 1 wherein the cooling device comprises a plurality of cooling tubes.

6. The method of claim 1 wherein at least a portion of the exposed surface of the cooling device comprises an alloy containing about 50–75% nickel.

7. The method of claim 6 wherein at least a portion of the exposed surface of the cooling device comprises an alloy containing about 0–1% silicon, 0.1–5% aluminum, and 5–40% chromium.

8. The method of claim 1 wherein the syngas comprises at least 75 mol % $H_2$ and Co.

9. The method of claim 8 wherein the syngas comprises at least 95 mol % $H_2$ and CO.

10. The method of claim 1 wherein the syngas has an $H_2$ to CO molar ratio less than 3:1.

11. The method of claim 1 wherein the syngas has an $H_2$ to CO molar ratio less than 2.5:1.

12. The method of claim 1 wherein the syngas has an $H_2$ to CO molar ratio less than 2.2:1.

13. The method of claim 1 wherein the syngas has an $H_2$ to CO molar ratio less than 2:1.

14. The method of claim 1 wherein at least a portion of the exposed surface of the cooling device comprises an alloy containing greater than 60% nickel.

15. The method of claim 8 wherein at least a portion of the exposed surface of the cooling device comprises an alloy containing greater than 60% nickel.

16. A method for producing $C_{5+}$ hydrocarbons from a feedstream comprising $C_1$–$C_4$ light hydrocarbons and molecular oxygen, the method comprising:
   providing a reactor vessel comprising a reaction zone and a cooling device, said reaction zone comprising a catalyst zone;
   reacting the feedstream comprising $C_1$–$C_4$ hydrocarbons and oxygen in the reaction zone to catalytically partially oxidize at least a portion of the feedstream comprising $C_1$–$C_4$ hydrocarbons to a syngas comprising at least about 70 mole percent $H_2$ and CO;
   flowing at least a portion of the syngas leaving the catalyst zone directly into the cooling device,
   wherein at least a portion of a syngas exposed surface of the reactor outside of the cooling device, a syngas exposed surface of the cooling device, or both comprise an alloy comprising primarily nickel; and
   feeding at least a portion of the cooled syngas into a hydrocarbon synthesis reactor, wherein at least a portion of the syngas is converted to $C_{5+}$ hydrocarbons.

17. The method of claim 16 wherein at least a portion of the exposed surface of the reactor vessel outside of the cooling device comprises an alloy comprising primarily nickel.

18. The method of claim 16 wherein at least a portion of the exposed surface of the cooling device comprises an alloy comprising primarily nickel.

19. The method of claim 18 wherein the portion of the cooling device which is subject to the highest temperatures comprises an alloy comprising primarily nickel.

20. The method of claim 16 wherein the cooling device comprises a plurality of cooling tubes.

21. The method of claim 16 wherein at least a portion of the exposed surface of the cooling devices comprises an alloy containing about 50–75% nickel.

22. The method of claim 21 wherein at least a portion of the exposed surface from the cooling devices comprises an alloy containing about 0–1% silicon, 0.1–5% aluminum, and 5–40% chromium.

23. The method of claim 16 wherein the product stream has a $H_2$ to CO molar ratio less than 3:1.

24. The method of claim 16 wherein the product stream has an $H_2$ to CO molar ratio less than 2.5:1.

25. The method of claim 16 wherein the product stream has an $H_2$ to CO molar ratio less than 2.2:1.

26. The method of claim 16 wherein the product stream has an $H_2$ to Co molar ratio less than 2:1.

27. The method of claim 16 wherein the product stream comprises at least about 75 mol % $H_{2\ and\ CO}$.

28. The method of claim 16 wherein the product stream comprises at least about 95 mol % $H_{2\ and\ CO}$.

29. The method of claim 16 wherein at least a portion of the exposed surface of the cooling device comprises an alloy containing greater than 60% nickel.

30. The method of claim 27 wherein at least a portion of the exposed surface of the cooling device comprises an alloy containing greater than 60% nickel.

31. A method for cooling a hydrocarbon partial oxidation product stream exiting a catalyst zone, the method comprising:
  providing a reactor vessel having a reaction zone comprising a catalyst zone configured to catalytically partially oxidize a light hydrocarbons to syngas and a cooling zone comprising at least one cooling device;
  feeding at least a portion of the stream leaving the catalyst zone directly through at least one said cooling device, wherein at least a portion of a syngas exposed surface of the cooling device comprises an alloy comprising primarily nickel; and
  wherein the hydrocarbon partial oxidation stream is generated in part or totally over a partial oxidation catalyst contained in said catalyst zone and comprises at least 70% $H_{2\ and\ CO}$.

32. The method of claim 31 wherein the stream comprises at least 75% $H_{2\ and\ CO}$.

33. The method of claim 32 wherein the stream comprises at least 95% $H_{2\ and\ CO}$.

34. The method of claim 32 wherein the stream has a $H_2$ to CO molar ratio less than 3:1.

35. The method of claim 31 wherein the product stream has an $H_2$ to CO molar ratio less than 2.5:1.

36. The method of claim 31 wherein the product stream has an $H_2$ to CO molar ratio less than 2.2:1.

37. The method of claim 31 wherein the product stream has an $H_2$ to CO molar ratio less than 2:1.

38. The method of claim 31 wherein the exposed surface of the cooling device comprises an alloy comprising about 50–70% nickel.

39. The method of claim 38 wherein the exposed surface of the cooling device comprises an alloy comprising about 0–1% silicon, 0.1–5% aluminum, and 5–40% chromium.

40. The method of claim 31 wherein the portion of the cooling device which is subject to the highest temperatures comprises an alloy comprising primarily nickel.

41. The method of claim 32 wherein at least a portion of the exposed surface of the cooling device comprises an alloy containing greater than 60% nickel.

* * * * *